United States Patent
Yanai (10) Patent No.: US 11,948,482 B2
(45) Date of Patent: Apr. 2, 2024

(54) DISPLAY METHOD AND NON-TRANSITORY COMPUTER-READABLE STORAGE MEDIUM STORING PROGRAM

(71) Applicant: SEIKO EPSON CORPORATION, Tokyo (JP)

(72) Inventor: Kohei Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 17/680,774

(22) Filed: Feb. 25, 2022

(65) Prior Publication Data

US 2022/0277675 A1 Sep. 1, 2022

(30) Foreign Application Priority Data

Feb. 26, 2021 (JP) .................................. 2021-029747

(51) Int. Cl.
*G09G 3/00* (2006.01)
*H04N 9/31* (2006.01)

(52) U.S. Cl.
CPC ........... *G09G 3/003* (2013.01); *H04N 9/3188* (2013.01); *G09G 2340/045* (2013.01); *G09G 2340/10* (2013.01); *G09G 2340/12* (2013.01)

(58) Field of Classification Search
None
See application file for complete search history.

(56) References Cited

U.S. PATENT DOCUMENTS

| 9,311,901 B2 * | 4/2016 | Webster | G09G 5/377 |
| 9,491,418 B2 * | 11/2016 | Iversen | G06F 3/011 |
| 10,096,122 B1 * | 10/2018 | Agrawal | G06T 7/90 |
| 10,410,349 B2 * | 9/2019 | Haraden | G09G 3/007 |
| 2006/0114358 A1 * | 6/2006 | Silverstein | G06T 5/001 348/E5.049 |
| 2009/0034867 A1 * | 2/2009 | Rempel | G06T 5/007 382/274 |
| 2011/0050864 A1 * | 3/2011 | Bond | H04N 13/261 348/42 |
| 2014/0375694 A1 | 12/2014 | Ohba et al. | |
| 2015/0002545 A1 * | 1/2015 | Webster | G09G 5/377 345/634 |

(Continued)

FOREIGN PATENT DOCUMENTS

| JP | S63-303477 A | 12/1988 |
| JP | 2002-032193 A | 1/2002 |

(Continued)

OTHER PUBLICATIONS

"The Interface", Lightform Guide.
"Dilation, Erosion, Opening, and Closing", Image Processing Solutions, Nov. 30, 2008, pp. 1-6.

*Primary Examiner* — Ryan M Gray
(74) *Attorney, Agent, or Firm* — Oliff PLC (57) ABSTRACT

The display method includes the steps of receiving input of first information representing an amount of an dilation process or a erosion process on a first mask image including a mask region, generating a second mask image by performing the dilation process or the erosion process corresponding to the first information based on an edge of the mask region on the first mask image, and displaying a projecting image obtained by superimposing the second mask image on an input image.

7 Claims, 10 Drawing Sheets

(56) References Cited

U.S. PATENT DOCUMENTS

2016/0330406 A1\* 11/2016 Muramatsu ............ H04N 7/142
2019/0287491 A1     9/2019 Kumagai

FOREIGN PATENT DOCUMENTS

| | | |
|---|---|---|
| JP | 2014-038266 A | 2/2014 |
| JP | 2015-005227 A | 1/2015 |
| JP | 2016-213677 A | 12/2016 |
| JP | 2017-117206 A | 6/2017 |
| JP | 2019-164191 A | 9/2019 |

\* cited by examiner

DISPLAY METHOD AND NON-TRANSITORY COMPUTER-READABLE STORAGE MEDIUM STORING PROGRAM

The present application is based on, and claims priority from JP Application Serial Number 2021-029747, filed Feb. 26, 2021, the disclosure of which is hereby incorporated by reference herein in its entirety.

BACKGROUND

1. Technical Field

The present disclosure relates to a display method and a non-transitory computer-readable storage medium storing a program.

2. Related Art

In JP-A-2019-164191 (Document 1), there is disclosed a mask image including a mask region and a non-mask region. When the mask image is superimposed on an input image, a portion on which the mask region is superimposed is masked so as not to visually be recognized, and a portion on which the non-mask region is superimposed fails to be masked so as to be able to visually be recognized. In Document 1, there is disclosed a technology of performing a magnification or demagnification process for generating a second masking process image in which the non-mask region is magnified or demagnified from a first dimension to a second dimension on a first masking process image having the non-mask region with the first dimension.

In the magnification or demagnification process of an image, it is possible to change the size of the original image while keeping the shape of the original image based on a predetermined point such as lower left corner of the original image. However, when performing the magnification or demagnification process on the image in which a positional relationship with the input image becomes the issue of concern such as the mask image, the positional relationship between the input image or the like and the mask image on which the magnification or demagnification process has been performed is shifted in some cases. Therefore, an on-target shape for the user is not achieved in some cases.

SUMMARY

A display method according to an aspect of the present disclosure includes the steps of receiving input of first information representing an amount of an dilation process or a erosion process on a first mask image including a mask region, performing the dilation process or the erosion process corresponding to the first information based on an edge of the mask region on the first mask image to generate a second mask image, and displaying a projecting image obtained by superimposing the second mask image on an input image.

A non-transitory computer-readable storage medium storing a program causes a computer to execute the steps of receiving input of first information representing an amount of an dilation process or a erosion process on a first mask image including a mask region, performing the dilation process or the erosion process corresponding to the first information based on an edge of the mask region on the first mask image to generate a second mask image, and displaying a projecting image obtained by superimposing the second mask image on an input image.

DESCRIPTION OF EXEMPLARY EMBODIMENTS

Some preferred embodiments of the present disclosure will hereinafter be described with reference to the accompanying drawings. It should be noted that in the drawings, the dimension or the scale size of each section is arbitrarily different from the reality, and some portions are shown schematically in order to make understanding easy. Further, the scope or the spirit of the present disclosure is not limited to these embodiments unless there is a particular description of limiting the present disclosure in the following explanation.

1. First Embodiment

Figure 1:
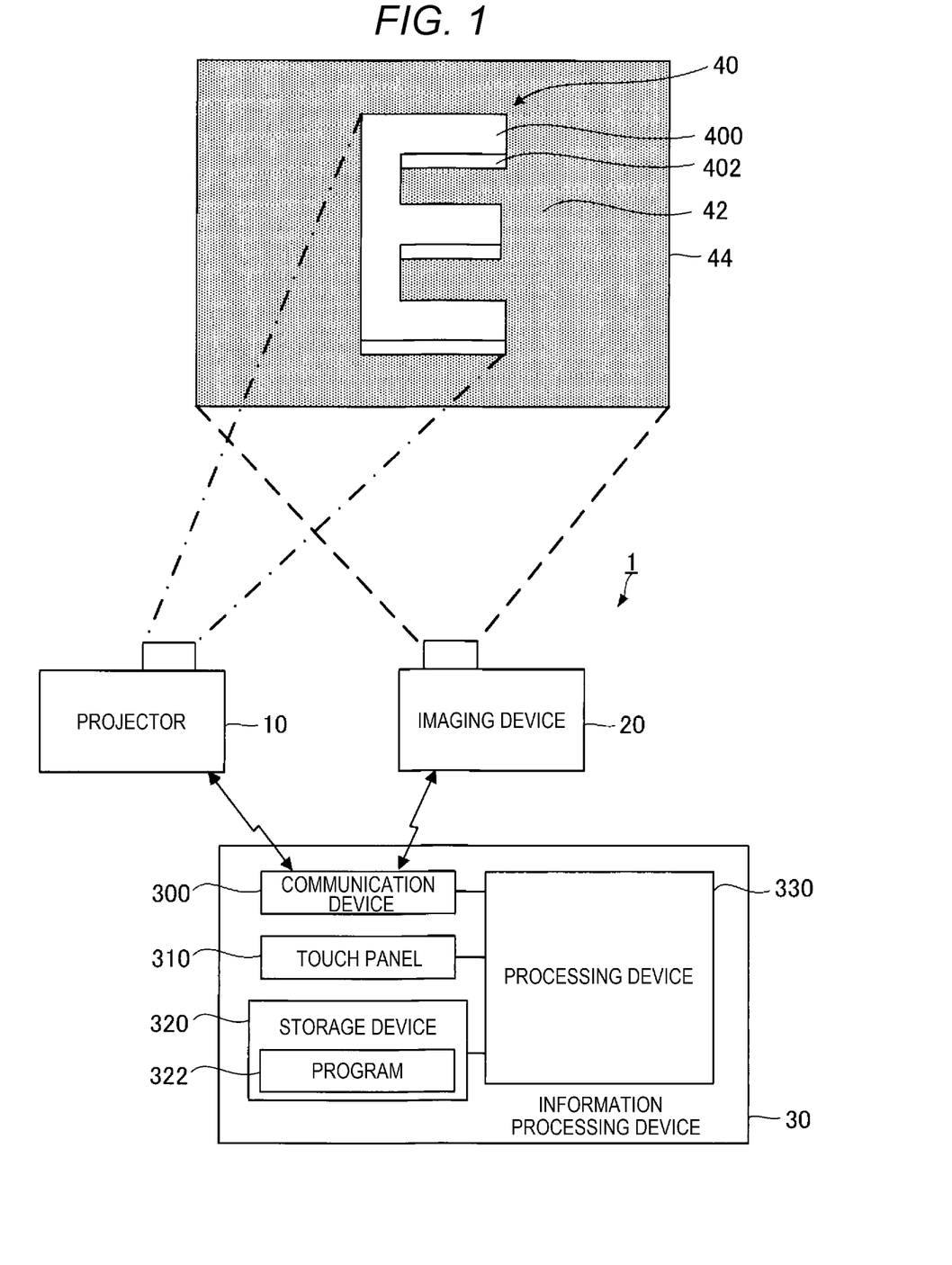
FIG. 1 is a schematic diagram showing an example of a projection system according to an embodiment.

FIG. 1 is a schematic diagram showing an example of a projection system 1 according to the embodiment. As shown in FIG. 1, the projection system 1 includes a projector 10, an imaging device 20, and an information processing device 30. The projection system 1 shown in FIG. 1 is a system for projecting an image on a body 40 having a three-dimensional shape. In the present embodiment, the body 40 is formed by cutting out a member shaped like a plate having a predetermined thickness so as to have a shape of a character of ☐E.☐ The body 40 has a bonding surface not shown and having contact with a wall surface 42, an obverse surface 400 as a surface at an opposite side to the bonding surface, and a side surface 402 coupling the bonding surface and the obverse surface 400 to each other. In the present embodiment, the obverse surface 400 of the body 40 is set in a projection region of an image. The projection region of the image from the projector 10 corresponds to a mask region described later.

The projector 10 is provided with a liquid crystal light valve, a projection lens, and a liquid crystal driver for projecting a projecting image 50 described later. Further, the projector 10 is provided with a super-high pressure mercury lamp or a metal halide lamp as a light source. The projector 10 is coupled to the information processing device 30 with, for example, a cable so as to be able to communicate therewith. The projector 10 obtains projecting image data from the information processing device 30 with the communication via the cable. The projector 10 projects the projecting image 50 represented by the projecting image data thus obtained in the mask region. Hereinafter, the mask region is a region where an input image 502 described later is displayed, and a region other than the mask region is a region where the input image 502 is not displayed, namely a region which is not masked. In the present embodiment, the communication between the projector 10 and the information processing device 30 is wired communication compliant with a standard such as Ethernet or USB (Universal Serial Bus). However, the communication between the projector 10 and the information processing device 30 can be wireless communication compliant with a standard such as Wi-Fi. It should be noted that Wi-Fi and Ethernet are each a registered trademark.

The imaging device 20 is, for example, a camera provided with an imaging element for converting the light collected into an electric signal such as a CCD (Charge Coupled Device) or a CMOS (Complementary Metal Oxide Semiconductor). In order to simplify the description, it is hereinafter assumed that the imaging device 20 takes a still image. It should be noted that the imaging device 20 can take a moving image instead of taking a still image. The imaging device 20 takes an image of an imaging region 44 including the body 40. In the present embodiment, the imaging region 44 includes the body 40 and the wall surface 42. The imaging device 20 is coupled to the information processing device 30 with, for example, a cable so as to be able to communicate with the information processing device 30 similarly to the projector 10. The imaging device 20 transmits taken image data representing the image thus taken to the information processing device 30. In the present embodiment, the communication between the imaging device 20 and the information processing device 30 is wired communication compliant with a standard such as Ethernet or USB, but can also be wireless communication compliant with a standard such as Wi-Fi. Further, although the imaging device 20 is a separate body from the information processing device 30 and the projector 10 in the present embodiment, it is possible for the imaging device 20 to be installed in anyone of the information processing device 30 and the projector 10.

The information processing device 30 is an example of an electronic apparatus, and is, for example, a personal computer. As shown in FIG. 1, the information processing device 30 has a communication device 300, a touch panel 310, a storage device 320, and a processing device 330. To the communication device 300, there is coupled the projector 10 via the cable. Further, to the communication device 300, there is coupled the imaging device 20 via the cable. The communication device 300 receives the taken image data transmitted from the imaging device 20. Further, the communication device 300 transmits the projecting image data representing the image to be projected on the body 40 under the control by the processing device 330.

The touch panel 310 is a device in which a display device for displaying a variety of types of information, and an input device to which information is input by a user are integrated with each other. The input device is, for example, a contact sensor like a transparent sheet. The input device is disposed so as to cover a display surface of the display device. The input device detects a touch position using a capacitance identified by the body making contact with the input device and the input device. The input device outputs data representing the touch position thus detected to the processing device 330. Thus, the operation content of the user to the touch panel 310 is transmitted to the processing device 330. It is assumed that the touch panel 310 functions as both of a display device and an input device in the present embodiment, but the display device and the input device can be disposed separately from each other. Specifically, it is possible for the information processing device 30 to be provided with a display as a display device, and at the same time, to be provided with a keyboard and a mouse as the input device.

The storage device 320 is a recording medium which can be read by the processing device 330. The storage device 320 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory of the storage device 320, there is stored a program 322 to be executed by the processing device 330 in advance. The volatile memory of the storage device 320 is used by the processing device 330 as a work area when executing the program 322. The program 322 can also be referred to as an ☐application program,☐ ☐application software,☐ or an ☐app.☐ The program 322 is obtained from, for example, a server not shown via the communication device 300, and is then stored in the storage device 320.

The processing device 330 is configured including a processor such as a CPU (Central Processing Unit), namely a computer. The processing device 330 can be formed of a single computer, or can also be formed of a plurality of computers. Taking the fact that the operation of instructing the start of the execution of the program 322 is made on the input device as a trigger, the processing device 330 retrieves the program 322 from the nonvolatile memory to the volatile memory. The processing device 330 executes the program 322 thus retrieved to the volatile memory.

Figure 2:
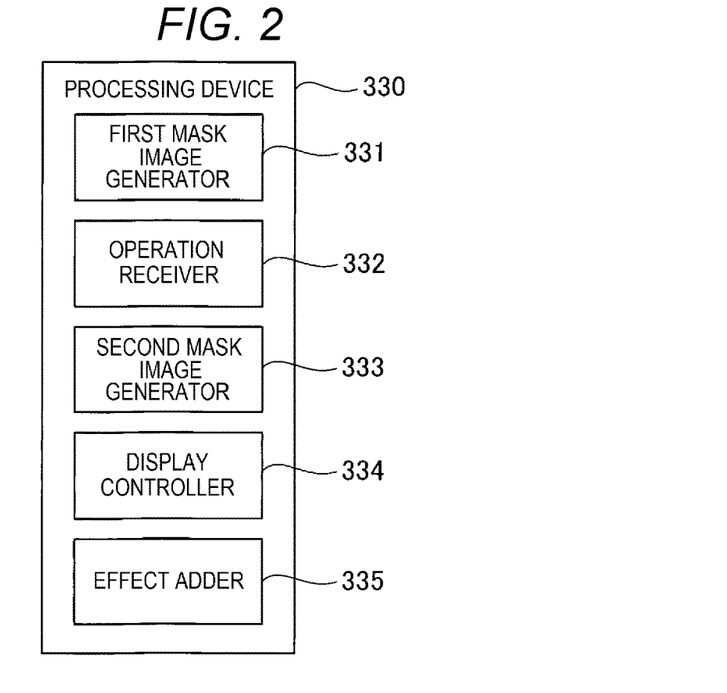
FIG. 2 is a block diagram showing a functional configuration of a processing device in a first embodiment.

FIG. 2 is a block diagram showing a functional configuration of the processing device 330. The processing device 330 which is currently operating in accordance with the program 322 functions as a first mask image generator 331, an operation receiver 332, a second mask image generator 333, a display controller 334, and an effect adder 335 shown in FIG. 2. The first mask image generator 331, the operation receiver 332, the second mask image generator 333, the display controller 334, and the effect adder 335 shown in FIG. 2 are software modules which are realized by making the processing device 330 operate in accordance with the program 322.

Figure 3:
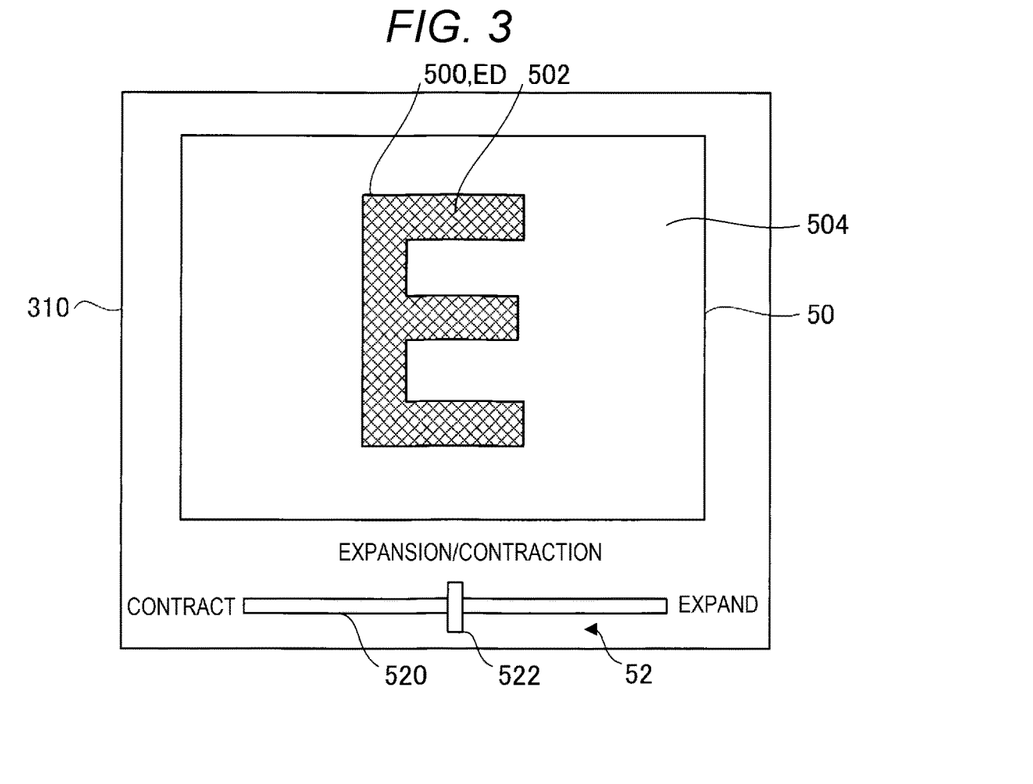
FIG. 3 is a diagram showing an example of a reception aspect of an dilation or erosion amount by an operation receiver.

The first mask image generator 331 generates a first mask image 500 for identifying a projection region of an image from the projector 10, namely the mask region. An example of the first mask image 500 is shown in FIG. 3. In the present embodiment, the first mask image generator 331 generates the first mask image 500 having an edge ED corresponding to an outline of the obverse surface 400 of the body 40 in a taken image using the taken image obtained by imaging the imaging region 44 including the body 40. More specifically, the first mask image generator 331 obtains the taken image obtained by imaging the imaging region 44 including the body 40 from the imaging device 20. The first mask image generator 331 identifies a region corresponding to the obverse surface 400 of the body 40 in the taken image, and then generates the first mask image 500 showing an edge ED of that region.

As the technology of identifying a predetermined region in an image, there are known a variety of methods. For example, there has been known a method in which the processing device 330 performs threshold processing on values of colors and depths of pixels in the image to identify a specific region. Further, there has been known a method in which the taken image including, for example, the body 40 is displayed on the touch panel 310, and the user manually draws the mask region on the touch panel 310 while looking at the taken image. In the generation of the first mask image 500 by the first mask image generator 331, it is possible to use any of these methods.

It is assumed that the information processing device 30 generates the first mask image 500 in the present embodiment, but this is not a limitation, and it is possible for the information processing device 30 to obtain the first mask image 500 generated in, for example, another information processing device via communication or the like. Further, it is possible for the processing device 330 to retrieve the first mask image 500 which has been generated by, for example, the first mask image generator 331 in the past, and has been stored in the storage device 320.

The operation receiver 332 receives input of information representing an amount of the dilation process or the erosion process on the first mask image 500 including the mask region. Hereinafter, the dilation process or the erosion process is referred to as a □dilation or erosion process,□ an amount of the dilation process or the erosion process is referred to as a □dilation or erosion amount,□ and information representing the amount of the dilation process or the erosion process is referred to as □dilation or erosion amount information.□ The □dilation or erosion amount information□ corresponds to first information.

Here, the dilation process is processing of moving the edge ED of the mask region outward, and the erosion process is processing of moving the edge ED of the mask region inward. The mask image on which the dilation or erosion process has been performed changes in size along the edge ED, and therefore, the shape changes from that of the original image. In contrast, a magnification or demagnification process is processing of extending or shrinking the edge ED of the mask region at a designated magnification. The mask image on which the magnification or demagnification process has been performed changes only in size based on a predetermined point while keeping the shape of the original image.

FIG. 3 is a diagram showing an example of the reception aspect of the dilation or erosion amount by the operation receiver 332. In the present embodiment, the display controller 334 described later displays the projecting image 50 including the first mask image 500 on the touch panel 310, and at the same time, displays a slider bar 52 as a user interface for receiving the designation of the dilation or erosion amount on the touch panel 310. The operation receiver 332 receives the operation amount to the slider bar 52 as the dilation or erosion amount.

First, the projecting image 50 will be described. In the present embodiment, the projecting image 50 includes at least the first mask image 500 and the input image 502. The projecting image 50 illustrated in FIG. 3 includes the first mask image 500, the input image 502, and a background image 504. The first mask image 500 is formed of a line representing the edge ED of the mask region. The region surrounded by the line is the mask region. The input image 502 is an image to be projected in the mask region. The input image 502 is set to a non-display state in a region other than the mask region. The input image 502 can be an image input from the outside to the processing device 330, or it is possible to generate the input image 502 as a monochromatic image inside the processing device 330. The background image 504 is an image forming the background of the input image 502 the display range of which is defined by the edge ED of the first mask image 500, and is a monochromatic image different in color from the input image 502 in the example shown in FIG. 3. It can be said that the background image 504 is an image showing a state in which the input image 502 is set to the non-display state outside the mask region.

Hereinafter, the projecting image 50, the first mask image 500, the input image 502, and the background image 504 different in aspect from those shown in FIG. 3 are illustrated in the drawings and the specification in some cases, but the reference symbols of the projecting image 50, the first mask image 500, the input image 502, and the background image 504 are also used when describing the names as generic names of the images besides the individual and specific aspects. In particular, it is assumed that the projecting image 50 includes a projecting image 54 including a second mask image 540 described later.

Figure 4:
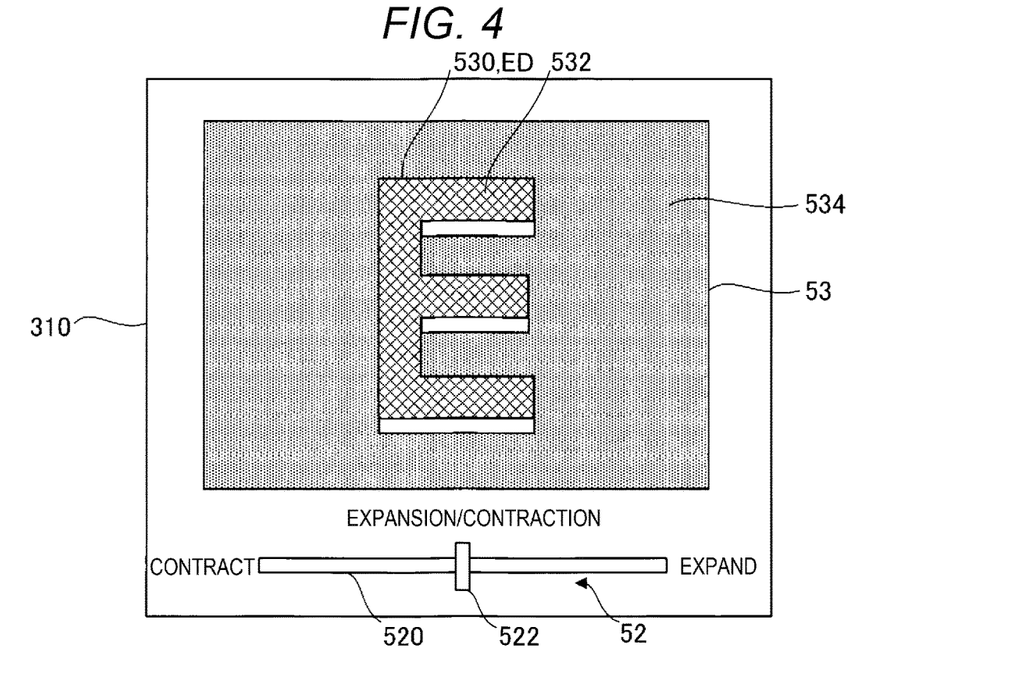
FIG. 4 is a diagram showing an example of the reception aspect of the dilation or erosion amount by the operation receiver.

FIG. 4 is a diagram showing another example of the reception aspect of the dilation or erosion amount by the operation receiver 332. In the example shown in FIG. 4, a projection image 53 includes a first mask image 530 showing the edge ED of the mask region, an input image 532, and a background image 534. The first mask image 530 and the input image 532 shown in FIG. 4 are substantially the same as the first mask image 500 and the input image 502 shown in FIG. 3. In contrast, the background image 534 shown in FIG. 4 is an image obtained by imaging a place where the projection by the projector 10 is performed, and is an image including the body 40 and the wall surface 42 taken by, for example, the imaging device 20. By superimposing the first mask image 530 and the input image 532 on such a background image 534, it is possible for the user to more particularly figure out the image when actually performing the projection by the projector 10.

Further, it is possible for the display controller 334 to, for example, actually project the projecting image 50 from the projector 10 to the body 40 in addition to displaying the projecting image 50 on the touch panel 310 of the information processing device 30 as shown in FIG. 3 and FIG. 4. By the projecting image 50 being actually projected on the body 40, it is possible for the user to more accurately and particularly figure out, for example, the positional relationship between the body 40 and the mask region, and a balance of hues. When the projecting image 50 is projected from the projector 10 to the body 40, it is conceivable that the projecting image 50 is generally constituted by the first mask image 500 and the input image 502, but it is possible for the projecting image 50 to further include the background image 504.

Then, the slider bar 52 will be described. The slider bar 52 is provided with a bar 520 extending in a predetermined direction, and a slider 522 which can move on the bar 520. In the examples shown in FIG. 3 and FIG. 4, the bar 520 extends in a horizontal direction of the screen of the touch panel 310. A central position in the horizontal direction of the bar 520 is a reference position of the slider 522. A right-hand area of the bar 520 is an dilation operation region, and a left-hand area is a erosion operation region. When the user moves the slider 522 rightward from the reference position, the operation receiver 332 receives a moving distance of the slider 522 as an amount of the dilation process. When the user moves the slider 522 leftward from the reference position, the operation receiver 332 receives a moving distance of the slider 522 as an amount of the erosion process. In other words, the operation receiver 332 converts the moving distance of the slider 522 into the dilation or erosion amount information described above.

When the projecting image 50 is actually projected from the projector 10 to the body 40, it is possible to display, for example, the slider bar 52 alone on the touch panel 310. Alternatively, an image obtained by imaging the body 40 on which the projecting image 50 is projected by the projector 10 using the imaging device 20 can be displayed together with the slider bar 52. Alternatively, such screen display as shown in FIG. 3 and FIG. 4 can be performed at the same time as the projection from the projector 10.

Figure 5:
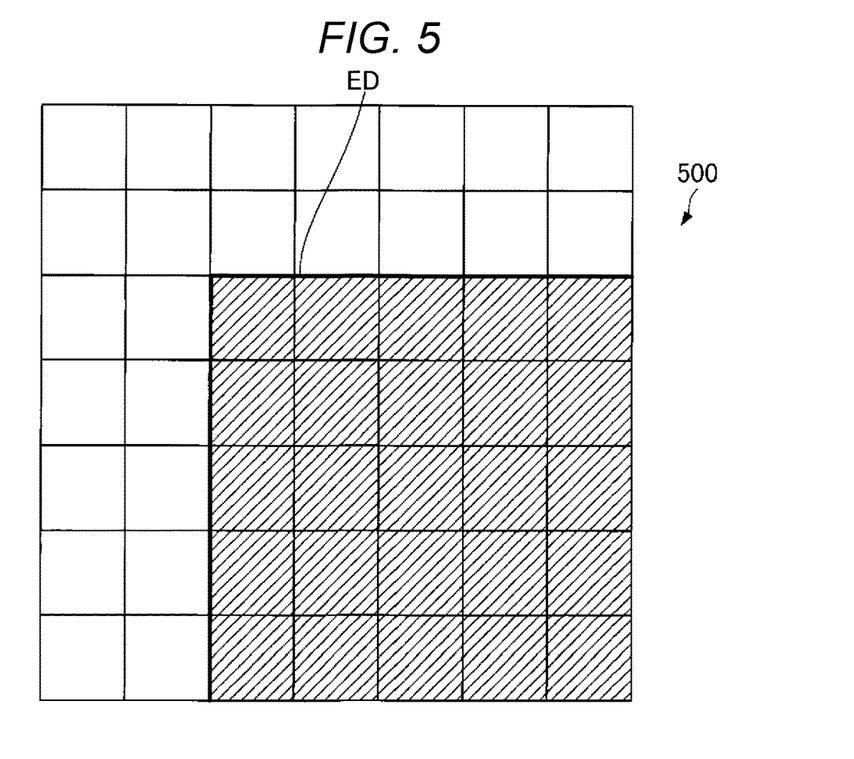
FIG. 5 is a schematic diagram for explaining an dilation process and a erosion process.
Figure 6:
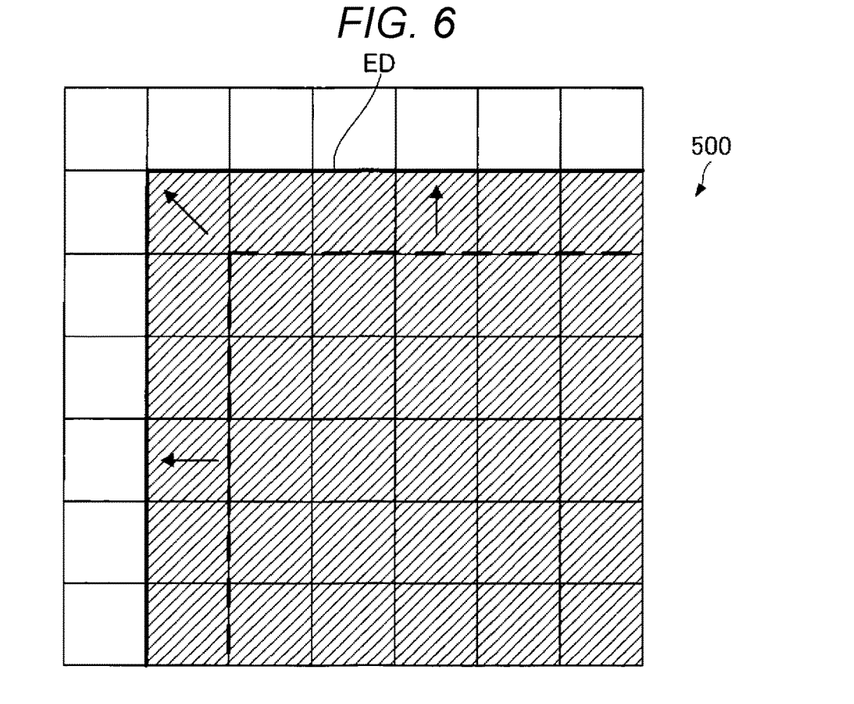
FIG. 6 is a schematic diagram for explaining the dilation process and the erosion process.
Figure 7:
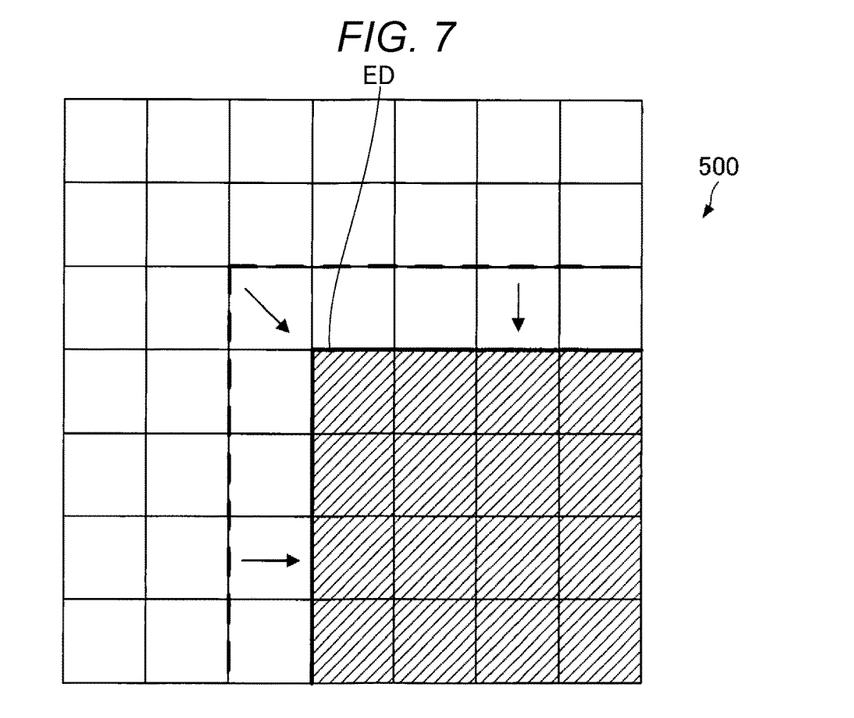
FIG. 7 is a schematic diagram for explaining the dilation process and the erosion process.
Figure 8:
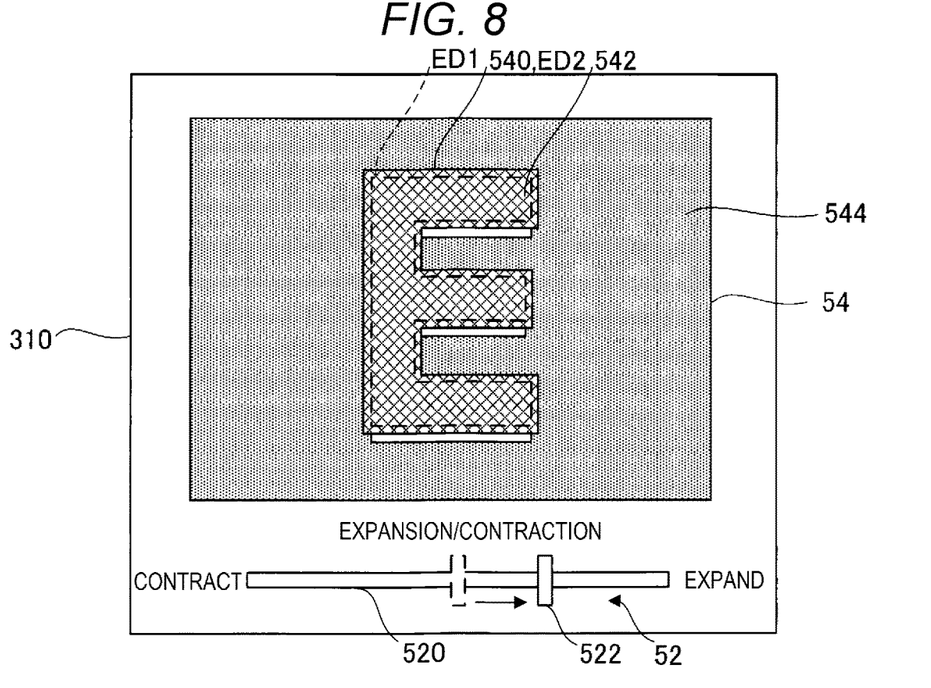
FIG. 8 is a diagram showing an example of a display aspect of a second mask image by a display controller.

The second mask image generator 333 shown in FIG. performs the dilation process or the erosion process corresponding to the dilation or erosion amount information based on the edge ED of the first mask image 500 on the first mask image 500 to generate the second mask image 540. An example of the second mask image 540 is shown in FIG. 8. FIG. 5 through FIG. 7 are schematic diagrams for explaining the dilation process and the erosion process. In FIG. 5 through FIG. 7, an inside of the mask region is indicated by hatching from a viewpoint of visibility. Further, each of the cells in FIG. 5 through FIG. 7 corresponds to, for example, a pixel.

FIG. 5 shows the vicinity of the edge ED of the first mask image 500. When performing the dilation process on the first mask image 500 shown in FIG. 5, the second mask image generator 333 moves the position of the edge ED to the outside of the mask region as shown in FIG. 6. In other words, in the present embodiment, the dilation process is processing of moving the edge ED of the mask image to the outside of the mask region as much as the pixels corresponding to the dilation or erosion amount information. When a pixel adjacent to a pixel including the edge ED of the first mask image 500 is not included in the mask region, □moving the position of the edge ED to the outside□ corresponds to including the adjacent pixel in the mask region. The pixels adjacent to each other in this case include pixels vertexes of which have contact with each other.

Further, when performing the erosion process on the first mask image 500 shown in FIG. 5, the second mask image generator 333 moves the position of the edge ED to the inside of the mask region as shown in FIG. 7. In other words, the erosion process is processing of moving the edge ED of the mask image to the inside of the mask region as much as the pixels corresponding to the dilation or erosion amount information. When any one of the pixels adjacent to the pixel including the edge ED of the first mask image 500 is not included in the mask region, □moving the position of the edge ED to the inside□ corresponds to excluding the pixel including the edge ED from the mask region. The pixels adjacent to each other in this case also include pixels vertexes of which have contact with each other.

The second mask image generator 333 performs the dilation process or the erosion process with the amount corresponding to the dilation or erosion amount information received in the operation receiver 332. Specifically, the second mask image generator 333 determines the number of pixels by which the edge ED is moved in the dilation process or the erosion process in accordance with the moving amount of the slider 522 by the user. The larger the moving amount of the slider 522 by the user is, the larger number of pixels by which the edge ED is moved in the dilation process or the erosion process the second mask image generator 333 determines.

The display controller 334 shown in FIG. 2 displays the projecting image 50 obtained by superimposing the second mask image 540 on the input image 532. On this occasion, it is possible for the operation receiver 332 to be arranged to receive input of information representing an amount of the dilation process or the erosion process on the second mask image 540. In other words, it is possible to arrange that it is possible for the user to readjust the position of the edge ED of the mask region while looking at the second mask image 540 displayed by the display controller 334.

Figure 9:
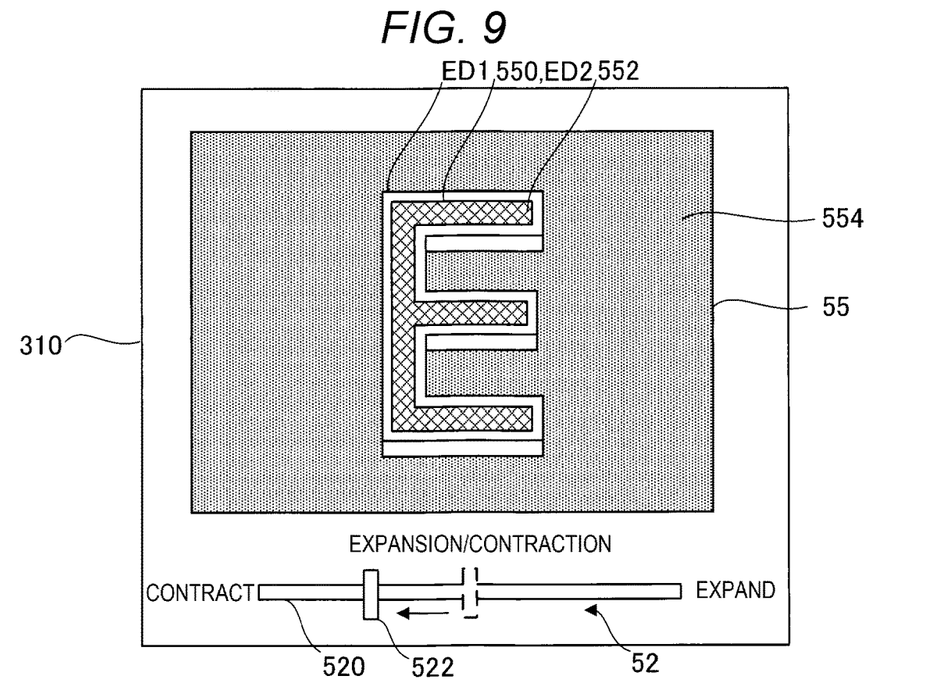
FIG. 9 is a diagram showing an example of the display aspect of the second mask image by the display controller.

FIG. 8 and FIG. 9 each show an example of the display aspect of the second mask image 540 by the display controller 334. FIG. 8 shows a display example of the projecting image 54 including the second mask image 540 generated by performing the dilation process on the first mask image 530 shown in FIG. 4. In FIG. 8, the projecting image 54 includes a second mask image 540, an input image 542, and a background image 544 as the taken image including the body 40, and is displayed on the touch panel 310. An edge ED2 of the second mask image 540 on which the dilation process has been performed is moved to the outer side of an edge ED1 of the first mask image 530 indicated by a dotted line.

Hereinafter, the second mask image 540 and the projecting image 54 including the second mask image 540 different in aspect from those shown in FIG. 8 are illustrated in the drawings and the specification in some cases, but the reference symbols of the second mask image 540 and the projecting image 54 including the second mask image 540 are also used when describing the names as generic names of the images besides the individual and specific aspects.

FIG. 9 shows a display example of a projecting image 55 including a second mask image 550 generated by performing the erosion process on the first mask image 530 shown in FIG. 4. In FIG. 9, the projecting image 55 includes the second mask image 550, an input image 552, and a background image 554 as the taken image including the body 40, and is displayed on the touch panel 310. The edge ED2 of the second mask image 540 on which the erosion process has been performed is moved to the inner side of the edge ED1 of the first mask image 530.

As shown in FIG. 8 and FIG. 9, it is possible for the display controller 334 to, for example, actually project the projecting image 54 from the projector 10 to the body 40 in addition to displaying the projecting image 54 on the touch panel 310 of the information processing device 30. By the projecting image 54 being actually projected on the body 40, it is possible for the user to more accurately and particularly figure out, for example, the positional relationship between the body 40 and the mask region having been expanded or contracted, and a balance of hues. When the projecting image 54 is projected from the projector 10 to the body 40, it is conceivable that the projecting image 54 is generally constituted by the second mask image 540 and the input image 542, but it is possible for the projecting image 54 to further include the background image 544.

In other words, displaying the projecting image 54 using the display controller 334 includes projecting the projecting image 54 in a region including the body 40 using the projector 10, and displaying the projecting image 54 on the touch panel 310 of the information processing device 30. Further, as shown in FIG. 8 and FIG. 9, when displaying the projecting image 54 on the touch panel 310 of the information processing device 30, it is possible for the display controller 334 to display the projecting image 54 superimposed on the taken image obtained by imaging the region including the body 40.

Further, in FIG. 8 and FIG. 9, the slider bar 52 for receiving the input of the dilation or erosion amount information from the user is displayed on the touch panel 310. The configuration and the function of the slider bar 52 are substantially the same as those explained using FIG. 3 and FIG. 4. The slider 522 shown in FIG. 8 and FIG. 9 is displayed at a position corresponding to the dilation or erosion amount having been performed on the second mask image 540 currently displayed. When the user performs an operation on the slider bar 52 while displaying the projecting image 54 including the second mask image 540, the second mask image generator 333 performs the dilation or erosion process as much as an amount corresponding to the operation amount of the slider bar 52 on the second mask image 540. Then, the display controller 334 displays the projecting image 50 including the mask image on which the dilation or erosion process has been performed.

The effect adder 335 shown in FIG. 2 adds an effect designated by the user to the projecting image 50. The effect means image processing which causes some visual effect to the viewer of the image. When addition of the effect is designated by the user, the effect adder 335 performs the image processing corresponding to the effect thus designated on the projecting image 50. The display controller 334 displays the projecting image 50 on which the image processing has been performed in the effect adder 335. The designation of the addition of the effect by the user can be performed at an arbitrary timing. For example, it is possible to designate the addition of the effect at the timing when the projecting image 50 including the first mask image 500 is displayed on the touch panel 310 as shown in FIG. 3 or FIG. 4, or it is possible to designate the addition of the effect at the timing when the projecting image 54 including the second mask image 540 is displayed on the touch panel 310 as shown in FIG. 8 or FIG. 9.

As an example of the specific effect, there can be cited, for example, displaying the input image 502 only in a part of the mask region, or stopping the display of the input image 502 in a part of the mask region. Further, for example, an input image 502 moving in the mask region, the input image 502 being replaced, and the input image 502 changing in color are examples of the effect.

Figure 10:
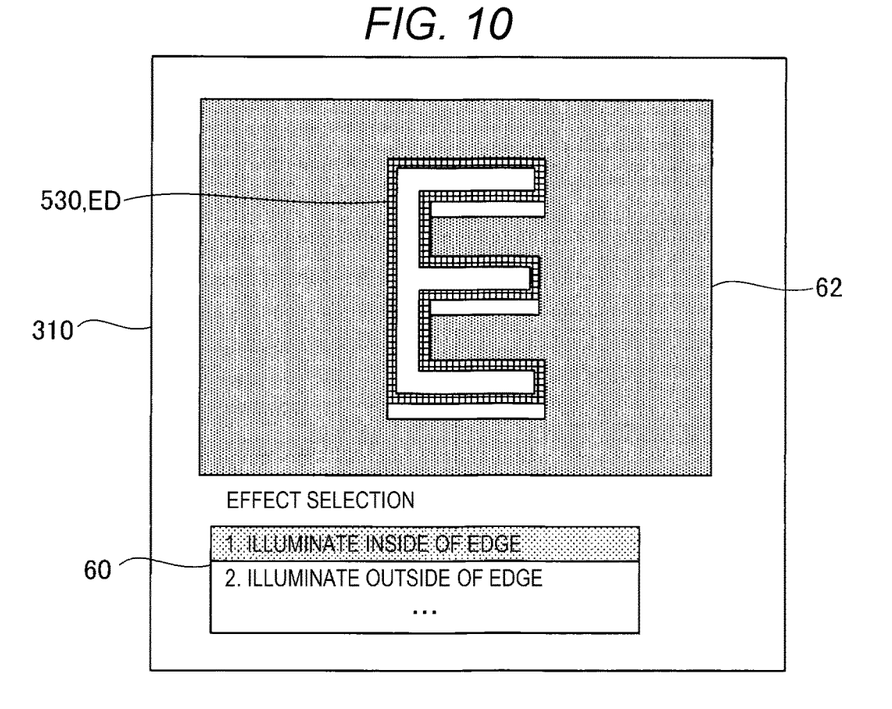
FIG. 10 is a diagram showing an example of an effect designation screen.
Figure 11:
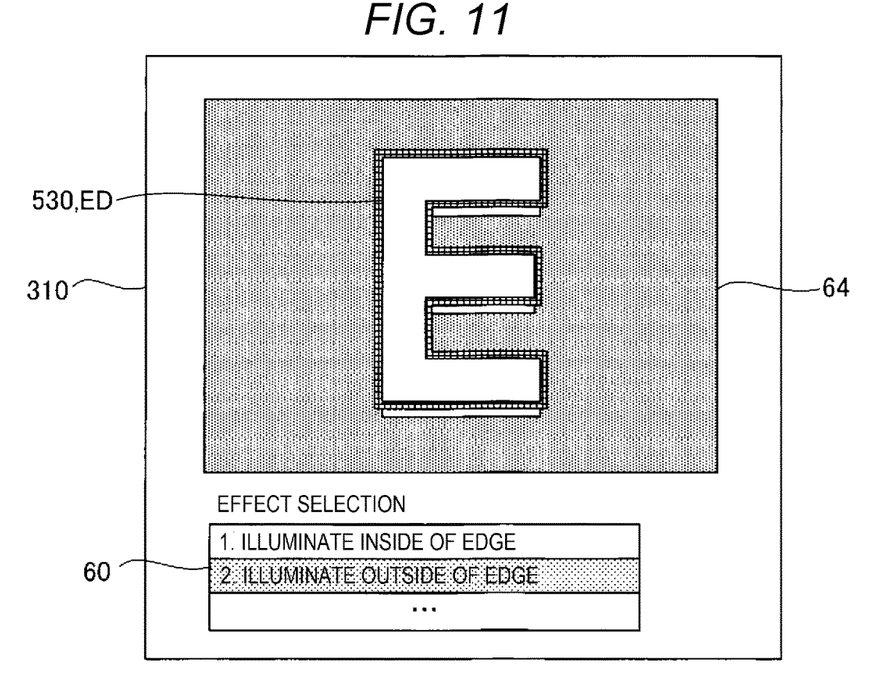
FIG. 11 is a diagram showing an example of the effect designation screen.

FIG. 10 and FIG. 11 are each a diagram showing an example of an effect designation screen. In FIG. 10 and FIG. 11, there is cited as an example when designating the addition of the effect to the projecting image 53 shown in FIG. 4. In FIG. 10 and FIG. 11, an effect selection menu 60 is displayed on the touch panel 310. In the effect selection menu 60, there are presented two types, namely ☐1. ILLUMINATE INSIDE OF EDGE,☐ and ☐2. ILLUMINATE OUTSIDE OF EDGE☐ as an example of the selective effects. When the user selects ☐1. ILLUMINATE INSIDE OF EDGE,☐ as shown in FIG. 10, there is displayed a projecting image 62 provided with image processing in which a portion within a predetermined distance from the edge ED inside the mask region of the first mask image 530 emits light. Further, when the user selects ☐2. ILLUMINATE OUTSIDE OF EDGE,☐ as shown in FIG. 11, there is displayed a projecting image 64 provided with image processing in which a portion within a predetermined distance from the edge ED outside the mask region of the first mask image 530 emits light.

When using such effects based on the edge ED of the mask region as illustrated in FIG. 10 and FIG. 11, there can arise a need such as providing a constant distance between the edge of the body 40 and the edge ED of the mask region. In the magnification or demagnification process, since only the size changes while keeping the shape of the mask image, it is unachievable to meet the need described above, and it is necessary to, for example, make over the mask image from the beginning. By making the dilation or erosion process based on the edge ED available as in the present embodiment, it is possible to easily adjust the mask region in accordance with the sensibility of the user, and it is possible to increase the degree of freedom of the image projection aspect to the body 40.

Figure 12:
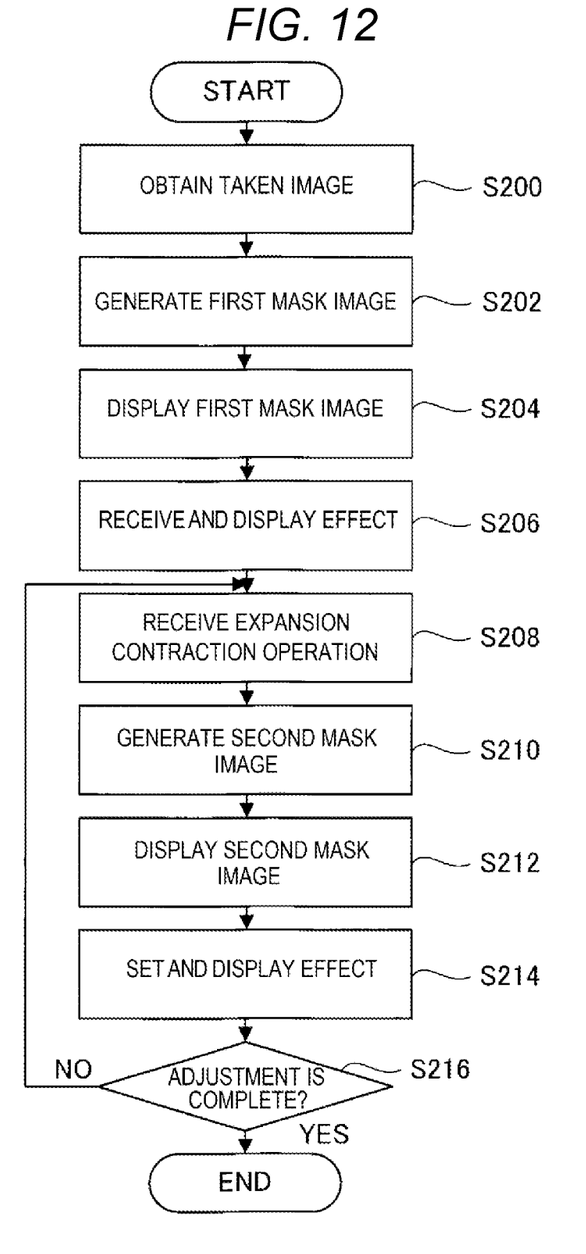
FIG. 12 is a flowchart showing a flow of a projection method performed by a processing device of an information processing device in accordance with a program.

FIG. 12 is a flowchart showing a flow of the projection method to be executed by the processing device 330 of the information processing device 30 in accordance with the program 322. In FIG. 12, it is assumed that the display destination of the projecting image 50 is the touch panel 310. The processing device 330 obtains (step S200) the taken image obtained by taking the region including the body 40 from the imaging device 20. The processing device 330 functions as the first mask image generator 331 to thereby generate (step S202) the first mask image 500 using the taken image obtained in the step S200. The first mask image 500 has the edge ED corresponding to the outline of the body 40 in the taken image. The processing device 330 functions as the display controller 334 to thereby display (step S204) the projecting image 50 including the first mask image 500 generated in the step S202 on the touch panel 310.

The processing device 330 functions as the effect adder 335 to thereby receive the designation of the effect from the user, and when receiving the designation of the effect, the processing device 330 displays (step S206) the projecting image 50 on which the image processing corresponding to the effect has been performed on the touch panel 310. It should be noted that when there is no need to add the effect, the execution of the step S206 can be omitted.

The processing device 330 functions as the operation receiver 332 to thereby receive (step S208) the dilation or erosion operation to the first mask image 500 from the user. In other words, the processing device 330 displays the projecting image 50 including the first mask image 500 and the slider bar 52 for receiving the dilation or erosion operation on the touch panel 310, and then receives the input of the dilation or erosion amount information with respect to the first mask image 500. When receiving the dilation or erosion operation from the user, the processing device 330 functions as the second mask image generator 333 to thereby perform the dilation or erosion process on the first mask image 500 to generate (step S210) the second mask image 540. Specifically, the processing device 330 performs the dilation process or the erosion process corresponding to the dilation or erosion amount information based on the edge ED of the first mask image 500 on the first mask image 500 to generate the second mask image 540.

The processing device 330 functions as the display controller 334 to thereby display (step S212) the projecting image 54 including the second mask image 540 generated in the step S210 on the touch panel 310. Further, the processing device 330 functions as the effect adder 335 to thereby display (step S214) the projecting image 50 on which the image processing corresponding to the effect has been performed on the touch panel 310 when receiving the designation of the effect in the step S206. It is possible to receive a change in the effect in the step S214, and when the effect has not been designated in the step S206, it is possible to newly receive the designation of the effect in the step S214. It should be noted that when there is no need to add the effect, the execution of the step S214 can be omitted.

The user looks at the projecting image 54 displayed on the touch panel 310 to determine whether the image to be projected on the body 40 fits the image in mind, or a further adjustment is necessary. It is possible for the processing device 330 to display a button for receiving input representing whether to complete the adjustment on the touch panel 310 in, for example, the step S212 or the step S214, and then determine whether to complete the adjustment (step S216) based on the operation by the user. As an example of the display, there is displayed at least a button to be selected when completing the adjustment. When continuing the adjustment, it is possible to display a button to be selected when continuing the adjustment, or it is possible to determine that the adjustment is continued when an operation on the slider bar 52 is made without displaying the button. The processing device 330 returns to the step S208 to repeat the subsequent processing until the adjustment by the user is completed (NO in the step S216). When the button for instructing the completion is pressed, and it is determined that the adjustment by the user is completed (YES in the step S216), the processing device 330 ends the processing of the present flowchart.

As described hereinabove, the processing device 330 of the information processing device 30 according to the first embodiment executes the program. 322 to thereby function as the first mask image generator 331, the operation receiver 332, the second mask image generator 333, the display controller 334, and the effect adder 335. The operation receiver 332 receives the input of the dilation or erosion amount information with respect to the first mask image 500 including the mask region. The second mask image generator 333 performs the dilation process or the erosion process corresponding to the dilation or erosion amount information based on the edge ED of the mask region on the first mask image 500 to generate the second mask image 540. The display controller 334 displays the projecting image 54 obtained by superimposing the second mask image 540 on the input image 542. Since the second mask image 540 is generated by expanding or contracting the first mask image 500 as much as the dilation or erosion amount based on the edge ED of the first mask image 500, there is no chance that the position of the second mask image 540 and the position of the first mask image 500 are shifted from each other by the image processing. Therefore, it is possible to easily perform the adjustment of the mask region in accordance with the sensibility of the user.

Further, the dilation process performed by the second mask image generator 333 is the processing of moving the edge ED toward the outside of the mask region as much as the pixels corresponding to the dilation or erosion amount information, and the erosion process is the processing of moving the edge ED toward the inside of the mask region as much as the pixels corresponding to the dilation or erosion amount information. Thus, it is possible for the user to easily perform the operation of enlarging or narrowing the mask region based on the edge ED.

Further, the first mask image generator 331 generates the first mask image 500 having the edge ED corresponding to the outline of the body 40 in the taken image using the taken image obtained by imaging the region including the body 40. Thus, it is possible for the user to easily obtain the first mask image 500 conformed with the shape of the body 40.

Further, the display controller 334 displaying the projecting image 50 includes at least one of projecting the projecting image 50 in the region including the body 40 using the projector 10, and displaying the projecting image 50 on the touch panel 310 of the information processing device 30. When projecting the projecting image 50 using the projector 10, it is possible for the user to more accurately and particularly figure out, for example, the positional relationship between the body 40 and the mask region, and a balance of hues. Further, when displaying the projecting image 50 on the touch panel 310 of the information processing device 30, it is possible for the user to confirm the second mask image 540 on which the dilation or erosion process has been performed even in a place at a distance from, for example, the body 40 or the projector 10.

Further, when displaying the projecting image 50 on the touch panel 310 of the information processing device 30, it is possible for the display controller 334 to display the projecting image 50 superimposed on the taken image obtained by imaging the region including the body 40. Thus, it is possible for the user to more clearly figure out the projection aspect of the input image 502 on the body 40 when displaying the projecting image 50 on the touch panel 310 to confirm the projecting image 50.

2. Second Embodiment

The second embodiment of the present disclosure will hereinafter be described. In the aspect hereinafter illustrated, regarding the elements substantially the same in operation and function as those in the first embodiment, the symbols used in the description of the first embodiment are diverted, and the detailed description of each of such elements are arbitrarily omitted.

The second embodiment is an embodiment which makes it possible to perform the magnification process or the demagnification process in addition to the dilation or erosion process on the first mask image 500 or the second mask image 540. As described above, the magnification or demagnification process is processing of extending or shrinking the edge ED of the mask region at a designated magnification. It can be said that the magnification process is the processing of interpolating pixels between the pixels of the image as a processing target, and the demagnification process is the processing of thinning the pixels of the image as the processing target. The mask image on which the magnification or demagnification process has been performed changes only in size based on a predetermined point while keeping the shape of the original image. In other words, the image on which the magnification or demagnification process has been performed has a similarity shape to the image on which the processing has not been performed. The first mask image 500 or the second mask image 540 to be the processing target is hereinafter referred to simply as a □processing-target mask image.□ Further, in FIG. 14 through FIG. 16, the reference symbol ED represents the edge of the mask image in each of the drawings.

Figure 13:
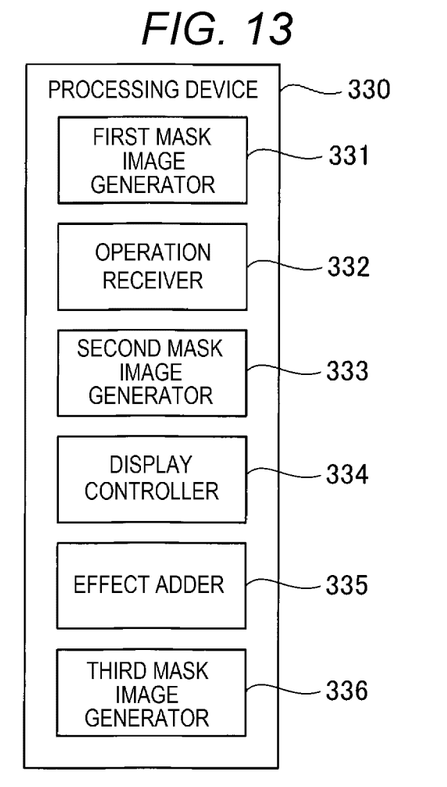
FIG. 13 is a block diagram showing a functional configuration of a processing device in a second embodiment.

FIG. 13 is a block diagram showing a functional configuration of the processing device 330 in the second embodiment. In the second embodiment, the processing device 330 which is operating in accordance with the program 322 functions as a third mask image generator 336 in addition to the first mask image generator 331, the operation receiver 332, the second mask image generator 333, the display controller 334, and the effect adder 335 as substantially the same operators as in the first embodiment. The third mask image generator 336 is also a software module realized by making the processing device 330 function in accordance with the program 322 similarly to the other operators.

In the second embodiment, the operation receiver 332 receives input of information representing an amount of the magnification process or the demagnification process on the processing-target mask image 700. Hereinafter, the magnification process or the demagnification process is referred to as a □magnification or demagnification process,□ an amount of the magnification process or the demagnification process is referred to as a □magnification or demagnification amount,□ and information representing the amount of the magnification process or the demagnification process is referred to as □magnification or demagnification amount information.□ The □magnification or demagnification amount information□ corresponds to second information.

Figure 14:
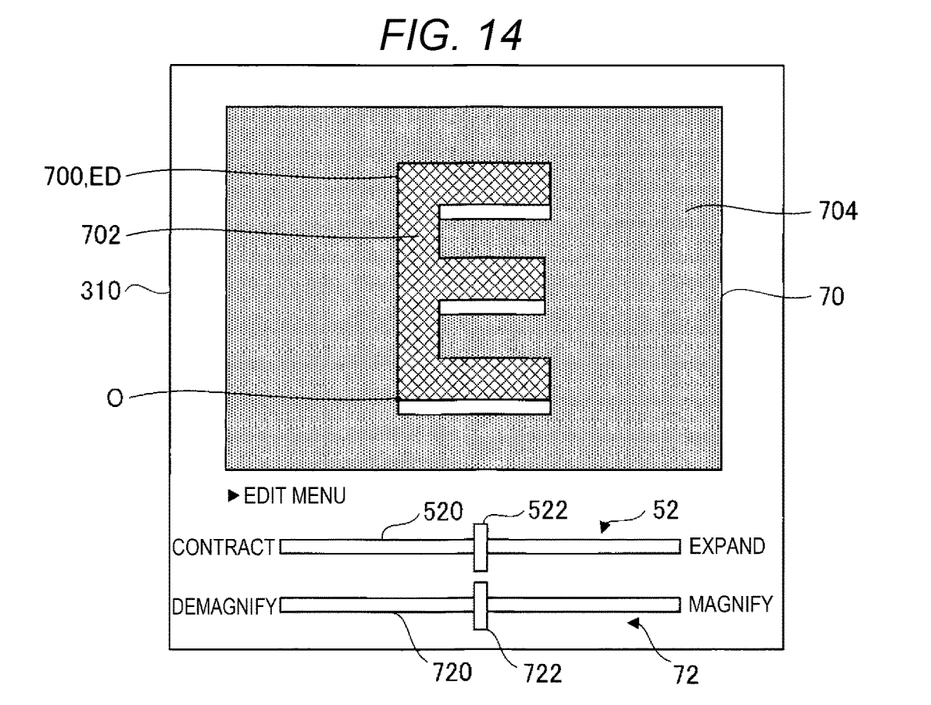
FIG. 14 is a diagram showing an example of a reception aspect of a magnification or demagnification amount by an operation receiver.

FIG. 14 is a diagram showing an example of the reception aspect of the magnification or demagnification amount by the operation receiver 332. In the second embodiment, the display controller 334 displays a projecting image 70 including the processing-target mask image 700 on the touch panel 310, and at the same time displays the slider bar 52 for receiving the designation of the dilation or erosion amount, and a slider bar 72 for receiving the designation of the magnification or demagnification amount. The projecting image 70 includes the processing-target mask image 700, an input image 702, and a background image 704.

Similarly to the slider bar 52, the slider bar 72 is provided with a bar 720 extending in a predetermined direction, and a slider 722 which can move on the bar 720. In the example shown in FIG. 14, the bar 720 extends in the horizontal direction of the screen, wherein the right-hand side corresponds to a magnification operation region, and the left-hand side corresponds to a demagnification operation region. A central position in the horizontal direction of the bar 720 is a reference position of the slider 722. When the user moves the slider 722 rightward, the operation receiver 332 receives a moving distance of the slider 722 as an amount of the magnification process. When the user moves the slider 722 leftward, the operation receiver 332 receives a moving distance of the slider 722 as an amount of the demagnification process. In other words, the operation receiver 332 converts the moving distance of the slider 722 into the magnification or demagnification amount information.

Figure 15:
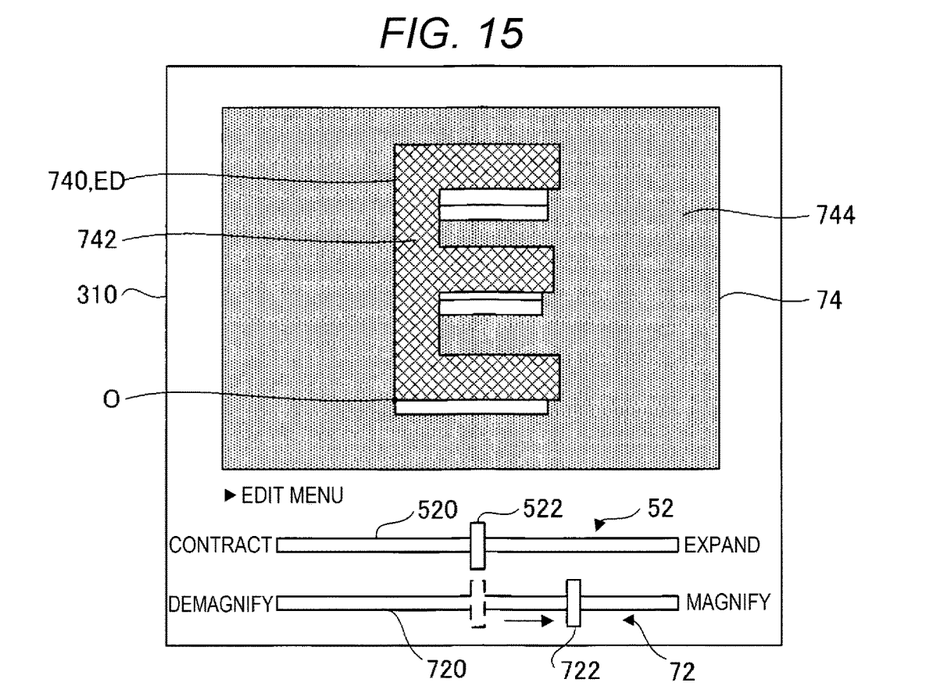
FIG. 15 is a diagram showing an example of a display aspect of a third mask image by a display controller.
Figure 16:
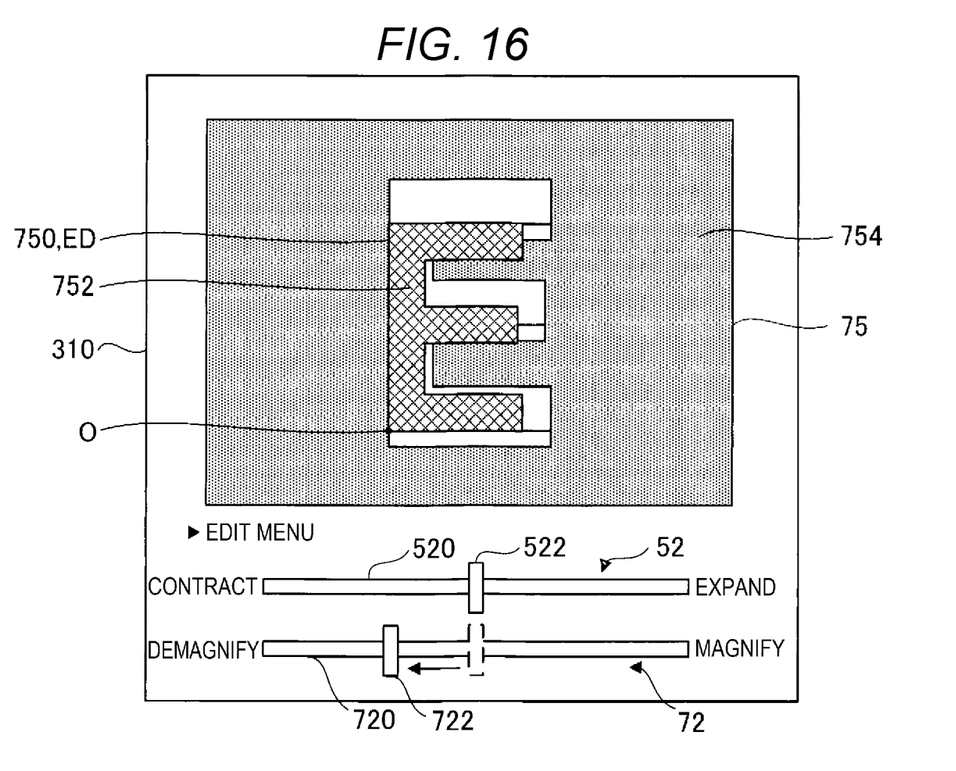
FIG. 16 is a diagram showing an example of the display aspect of the third mask image by the display controller.

The third mask image generator 336 shown in FIG. 13 performs the magnification process or the demagnification process corresponding to the magnification or demagnification amount information on the processing-target mask image 700 to generate the third mask images 740, 750. The third mask image 740 is illustrated in FIG. 15, and the third mask image 750 is illustrated in FIG. 16. Specifically, the third mask image generator 336 determines the number of pixels with which the interpolation is performed in the magnification process, or the number of pixels with which the thinning is performed in the demagnification process in accordance with the moving amount of the slider 722 by the user. The larger the moving amount in the rightward direction of the slider 722 by the user is, the larger number of pixels the third mask image generator 336 uses for the interpolation in the magnification process. Further, the larger the moving amount in the leftward direction of the slider 722 by the user is, the larger number of pixels the third mask image generator 336 thins in the demagnification process.

The display controller 334 shown in FIG. 13 displays the projecting images 74, 75 obtained by superimposing the third mask images 740, 750 on the input images 742, 752. The projecting image 74 is illustrated in FIG. 15, and the projecting image 75 is illustrated in FIG. 16. On this occasion, it is possible for the operation receiver 332 to be arranged to receive input of information representing an amount of the magnification process or the demagnification process on the third mask images 740, 750. In other words, it is possible to arrange that it is possible for the user to readjust the mask image while looking at the third mask images 740, 750 displayed by the display controller 334.

FIG. 15 and FIG. 16 show examples of the display aspects of the third mask images 740, 750 by the display controller 334. The slider 722 shown in FIG. 15 and FIG. 16 is displayed at a position corresponding to the magnification or demagnification amount having been performed on the third mask images 740, 750 currently displayed. FIG. 15 shows the projecting image 74 including the third mask image 740 generated by performing the magnification process on the processing-target mask image 700 shown in FIG. 14. In FIG. 15, the projecting image 74 includes the third mask image 740, the input image 742, and the background image 744 as the taken image including the body 40, and is displayed on the touch panel 310. The third mask image 740 on which the magnification process has been performed is magnified in the vertical direction and the horizontal direction at an equal ratio based on the point O compared to the processing-target mask image 700.

FIG. 16 shows the projecting image 75 including the third mask image 750 generated by performing the demagnification process on the processing-target mask image 700 shown in FIG. 14. In FIG. 16, the projecting image 75 includes the third mask image 750, the input image 752, and the background image 754 as the taken image including the body 40, and is displayed on the touch panel 310. The third mask image 750 on which the demagnification process has been performed is demagnified in the vertical direction and the horizontal direction at an equal ratio based on the point O compared to the processing-target mask image 700.

In other words, in the second embodiment, the operation receiver 332 receives the input of the information representing the amount of the magnification process or the demagnification process on the processing-target mask image 700 as the first mask image 500 or the second mask image 540. The third mask image generator 336 performs the magnification process or the demagnification process corresponding to the information representing the amount of the magnification process or the demagnification process on the processing-target mask image 700 to generate the third mask images 740, 750. The display controller 334 displays the projecting images 74, 75 obtained by superimposing the third mask images 740, 750 on the input images 742, 752. Thus, it becomes possible for the user to instruct the magnification or demagnification process in addition to the dilation or erosion process on the mask image, and thus it is possible for the user to more easily, and particularly perform the adjustment of the mask region according to the sensibility of the user.

3. Modified Examples

Each of the aspects illustrated hereinabove can variously be modified. Some specific aspects of the specific modifications which can be applied to each of the aspects described above will be illustrated below. Two or more aspects arbitrarily selected from the following illustrations can arbitrarily be combined with each other unless conflicting with each other.

In the present embodiments, it is assumed that the processing device 330 displays the slider bar 52 as the interface for receiving the designation of the dilation or erosion amount from the user, but the interface is not limited thereto. For example, it is possible to adopt two buttons one of which is associated with the dilation process amount, and the other of which is associated with the erosion process amount as the interface. In this case, every time the user presses the button associated with the dilation process amount once, the processing device 330 moves the edge ED of the processing-target image 700 outward by predetermined unit pixels. Further, every time the user presses the button associated with the erosion process amount once, the processing device 330 moves the edge ED of the processing-target image 700 inward by the predetermined unit pixels. It is possible for the two buttons to be attached with marks pointing respective directions opposite to each other such as triangles, or to be provided with shapes pointing respective directions opposite to each other. Thus, it becomes easy for the user to intuitively operate the buttons. Further, for example, a form to which the user can input a numerical value can be used as the interface. In this case, the user inputs the number of pixels by which the edge ED is moved when, for example, performing the dilation or erosion process to thereby designate the dilation or erosion amount. Further, it is possible to dispose an interface for receiving the designation of the dilation or erosion amount by, for example, voice input.

Further, in the second embodiment, the processing device 330 displays the slider bar 52 for receiving the designation of the dilation or erosion amount and the slider bar 72 for receiving the designation of the magnification or demagnification amount at the same time. However, it is possible for the processing device 330 to display an interface for designating, for example, a content of the processing which the user wants to perform next, and then display an interface for designating the processing amount of the processing after the content of the processing is designated by the user. Further, when a pinch-out operation is performed by the user on the processing-target mask image 700 on the touch panel 310 when, for example, displaying the slider bar 52 for receiving the designation of the dilation or erosion amount, it is possible for the processing device 330 to receive the pinch-out operation as the magnification process operation, and when a pinch-in operation is performed, it is possible for the processing device 330 to receive the pinch-in operation as the demagnification process operation.

Further, in the present embodiments, it is assumed that the processing device 330 receives the dilation or erosion process and the magnification or demagnification process as the processing on the mask image. However, it is possible for the processing device 330 to receive other processing such as translation, rotation, and inversion, and it is possible to provide an interface therefore together with the interface for receiving the dilation or erosion process and the magnification or demagnification process.

What is claimed is:

1. A display method comprising:
   generating a first mask image indicating an edge of a mask region that is a region on which an input image is projected, the edge corresponding to an outline of a body on which the input image is to be projected;
   receiving input of first information representing an amount of an dilation process or an erosion process on the first mask image including the mask region;
   generating a second mask image by performing the dilation process or the erosion process corresponding to the first information based on the edge of the mask region on the first mask image; and
   displaying a projecting image obtained by superimposing the second mask image on the input image.

2. The display method according to claim 1, wherein
   the dilation process is processing of moving the edge toward an outside of the mask region as much as pixels corresponding to the first information, and
   the erosion process is processing of moving the edge toward an inside of the mask region as much as the pixels corresponding to the first information.

3. The display method according to claim 1, further comprising:
   generating the first mask image using a taken image obtained by imaging a region including the body.

4. The display method according to claim 1, wherein
   the displaying the projecting image includes at least one of
       projecting the projecting image in the region including the body using a projector, or
       displaying the projecting image on a display device provided to an electronic apparatus.

5. The display method according to claim 4, wherein
   the displaying the projecting image on the display device includes displaying the projecting image superimposed on a taken image obtained by imaging the region including the body.

6. The display method according to claim 1, further comprising:
   receiving input of second information representing an amount of a magnification process or a demagnification process on the first mask image or the second mask image;
   generating a third mask image by performing the magnification process or the demagnification process corresponding to the second information on the first mask image or the second mask image; and
   displaying a projecting image obtained by superimposing the third mask image on an input image.

7. A non-transitory computer-readable storage medium storing a program comprising:
   generating a first mask image indicating an edge of a mask region that is a region on which an input image is projected, the edge corresponding to an outline of a body on which the input image is to be projected;
   receiving input of first information representing an amount of an dilation process or an erosion process on the first mask image including the mask region;
   generating a second mask image by performing the dilation process or the erosion process corresponding to the first information based on the edge of the mask region on the first mask image; and
   displaying a projecting image obtained by superimposing the second mask image on the input image.

* * * * *